Patented Feb. 9, 1926.

1,572,768

UNITED STATES PATENT OFFICE.

JÜRGEN CALLSEN, OF ELBERFELD, GERMANY, ASSIGNOR TO WINTHROP CHEMICAL COMPANY, INC., OF NEW YORK, N. Y.

PHARMACEUTICAL PRODUCT.

No Drawing.    Application filed June 26, 1925.   Serial No. 39,864.    REISSUED To all whom it may concern:

Be it known that I, JÜRGEN CALLSEN, a citizen of Germany, residing at Elberfeld, in the State of Prussia, Germany, have invented new and useful Improvements in Pharmaceutical Products, of which the following is a specification.

The present invention relates to the manufacture and production of new pharmaceutical products being chemically basic ethers of quinolines. The new products have proved to be useful in the treatment of diseases of the heart.

The new products are generally colorless to yellowish oils soluble in the usual organic solvents. They form solid salts with mineral acid, e. g. ClH which salts retain the above defined valuable properties. They are soluble in water and can be used for subcutaneous injections.

The process for producing my new products consists in treating quinoline compounds with amino alcohols.

In order to illustrate the new process more fully, the following examples are given, the parts being by weight:

178 parts of dimethylaminoethanol are dissolved in 800 parts of xylol and 46 parts of small pieces of sodium are added thereto. After cooling 355 parts of lepidin are added and the mixture is slowly heated. At 100° C. the reaction begins, common salt being precipitated. Subsequently the mixture is still heated during several hours. After cooling water and dilute hydrochloric acid are added. On shaking the salt enters into solution and the new base dissolves as hydrochloride. By the addition of alkali it is precipitated and purified by distillation in vacuo.

The α-oxylepidindimethylanimoethylether is an almost colorless liquid boiling at 175–178° C. under a pressure of 10 mm. It is soluble in alcohol, ether, acetone, insoluble in water.

It forms two series of salts with hydrochloric acid. By leading HCl into an ethereal solution until saturation the salt having most probably the formula

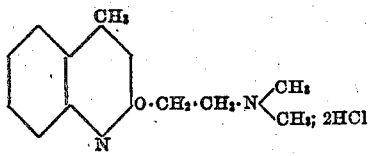

is obtained. It is a white crystalline powder melting at 162–164° C.

By the addition of a molecular proportion of HCl dissolved in alcohol to an alcoholic solution of the base the other salt,

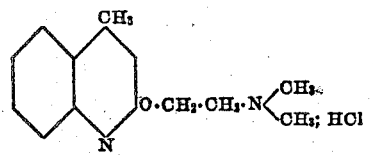

is obtained. It is a white crystalline powder melting at 190–191° C.

The α-oxy-γ-methylquinolinepiperidoethylether (obtained from α-chlorlepidin and piperidoethanol) is a yellowish oil boiling at 232–234° C. under a pressure of 17 mm. It is soluble in alcohol, ether, benzene, acetone, almost insoluble in water. Its dihydrochloride is a white crystalline powder melting at 186–187° C.

The α-methyl-γ-oxyquinolinedimethylaminoethylether (obtained from γ-chloroquinaldine and dimethylaminoethanol) is an oil boiling at 190° C. under a pressure of 10 mm. It is soluble in ether, acetone and benzene.

I claim:—

1. The herein described new basic ethers of quinolines, being generally from colorless to yellowish oils soluble in the usual organic solvents almost insoluble in water, being useful in the treatment of diseases of the heart, forming two series of salts with hydrochloric acid which retain the valuable properties of the free bases.

2. The herein described α-oxylepidindimethylaminoethylether being an almost colorless oil boiling at 175–178° C. under a pressure of 10 mm. soluble in alcohol and ether, almost insoluble in water; its dihydrochloride being a white crystalline mass melting at 162–164° C.; monohydrochloride melting at 190–191° C. being useful in the treatment of diseases of the heart.

In testimony whereof I have hereunto set my hand.

JÜRGEN CALLSEN.